No. 833,735. PATENTED OCT. 23, 1906.
S. A. DILLAVOU.
CORN HUSKER.
APPLICATION FILED JAN. 12, 1906.
2 SHEETS—SHEET 1.
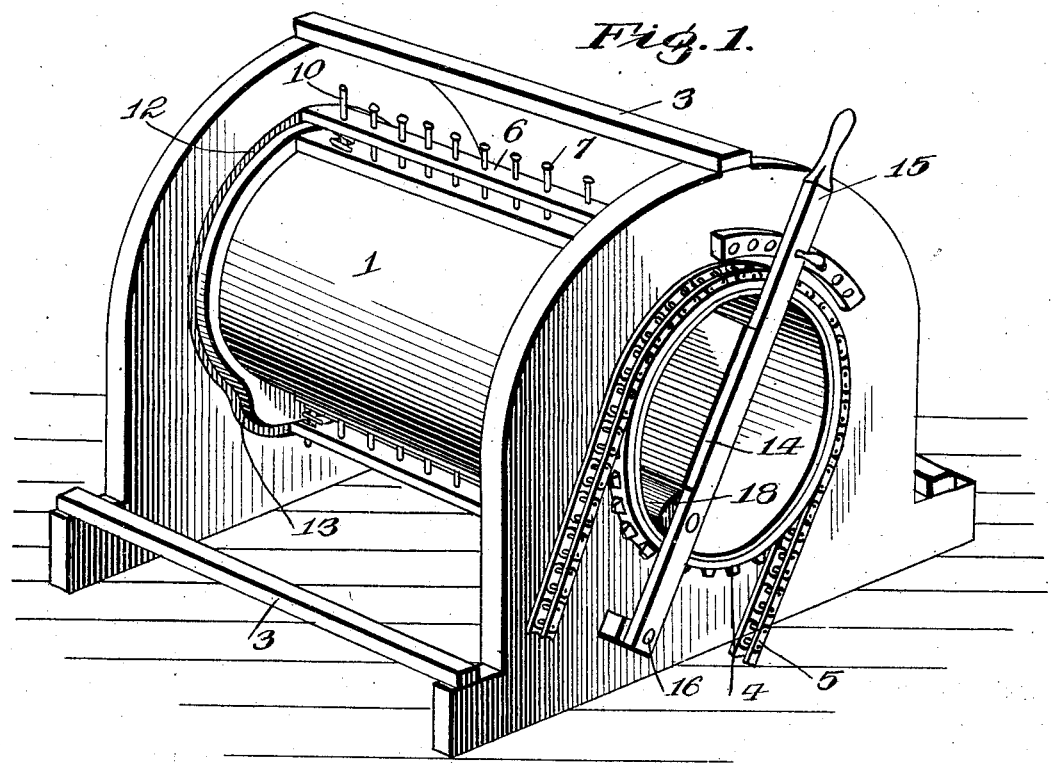
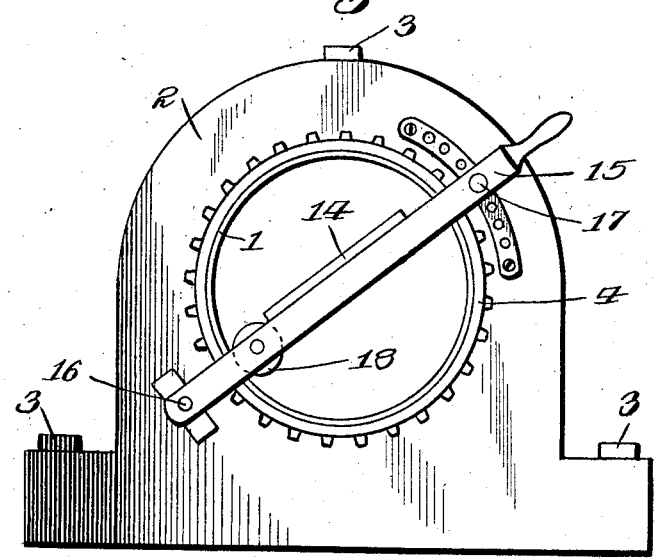
Witnesses
Inventor
Samuel A. Dillavou
By
Attorneys No. 833,735. PATENTED OCT. 23, 1906.
S. A. DILLAVOU.
CORN HUSKER.
APPLICATION FILED JAN. 12, 1906.
2 SHEETS—SHEET 2.
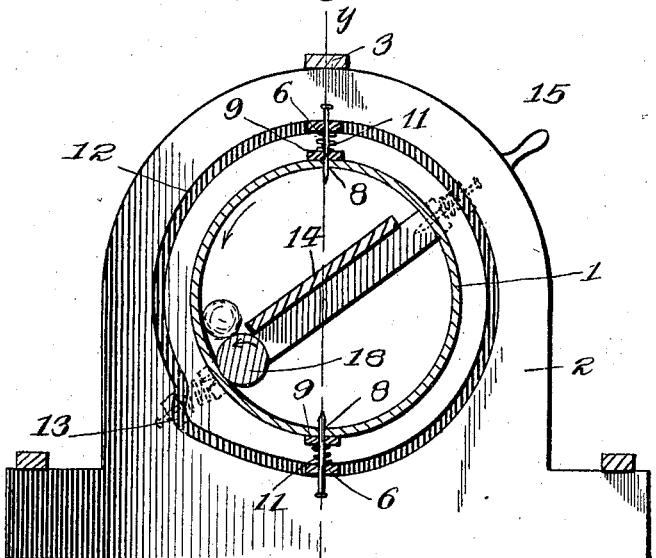
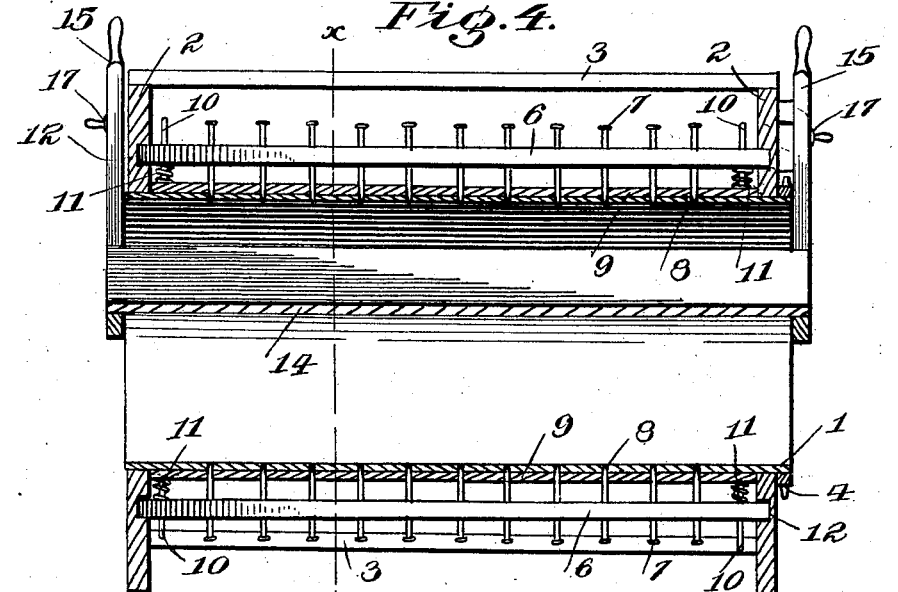
Inventor
Samuel A. Dillavou
Witnesses
By
Attorneys

UNITED STATES PATENT OFFICE.

SAMUEL A. DILLAVOU, OF RALSTON, IOWA, ASSIGNOR OF ONE-HALF TO JOHN NICHOLSON, OF RALSTON, IOWA.

CORN-HUSKER.

No. 833,735.  Specification of Letters Patent.  Patented Oct. 23, 1906.

Application filed January 12, 1906. Serial No. 295,774.

*To all whom it may concern:*

Be it known that I, SAMUEL A. DILLAVOU, a citizen of the United States, residing at Ralston, in the county of Carroll and State of Iowa, have invented certain new and useful Improvements in Corn-Huskers, of which the following is a specification.

This invention has for its object to devise a novel machine for divesting ears of corn of their husks, the purpose being to provide a mechanism which will perform the operation of husking corn in a rapid and effective manner without injuring the grain or kernels.

The machine embodies a rotary cylinder or drum; a deflecting-board arranged within the cylinder and normally inclined so as to direct the ears toward the inner side of the cylinder or drum, said deflecting-board being relatively adjustable to vary its inclination as occasion may require; a husking-roll coöperating with the cylinder and deflecting-board; husking devices carried by and rotatable with the cylinder or drum and embodying toothed bars, and means for imparting an approximately radial movement to the toothed bars, whereby the teeth thereof are projected into the cylinder or drum and withdrawn therefrom in the operation of the machine.

For a full description of the invention and the merits thereof and also to acquire a knowledge of the details of construction of the means for effecting the result reference is to be had to the following description and accompanying drawings.

While the invention may be adapted to different forms and conditions by changes in the structure and minor details without departing from the spirit or essential features thereof, still the preferred embodiment is shown in the accompanying drawings, in which—

Figure 1 is a perspective view of a corn-husking machine embodying the invention. Fig. 2 is an end view thereof. Fig. 3 is a transverse section of the machine on the line *x x* of Fig. 4. Fig. 4 is a longitudinal section of the machine on the line *y y* of Fig. 3.

Corresponding and like parts are referred to in the following description and indicated in all the views of the drawings by the same reference characters.

The machine embodies a rotary cylinder or drum 1 and a suitable framework therefor and for the adjunctive coöperating parts, said framework embodying side pieces or uprights 2 and cross-timbers 3. The rotary cylinder or drum 1 may be of any length and diameter and constructed in any manner of suitable material and is preferably formed of sheet metal and is open at opposite ends to admit of ready ingress of the ears of corn to be husked and the discharge of said ears after the husks have been stripped therefrom. The rotary cylinder or drum is preferably inclined longitudinally so as to effect a discharge and feed of the ears therethrough by gravitative action. The cylinder 1 is mounted in the apparatus 2 in any manner so as to minimize the friction and admit of rotating the drum with the expenditure of the smallest amount of energy possible. Rotary movement may be imparted to the drum from any suitable source of power, and for convenience the drum is provided at one end with cog-teeth 4, and a sprocket-chain 5 coöperates with said teeth and serves to transmit motion from the source of power to said drum.

One or more stripping devices are provided for coöperation with the drum and consists of a bar 6, provided with teeth 7, said bar having an approximately radial movement to admit of projecting or withdrawing the teeth 7. The cylinder or drum 1 has a series of openings 8, corresponding in number and position with the teeth 7 to admit of the latter projecting into the cylinder, so as to come in contact with the ears and effect a stripping of the husks therefrom. The teeth 7 preferably consist of pins fitted to the bar 6 in any manner to be readily removed or adjusted as occasion may require, said pins being held frictionally in openings formed in the bar 6 or secured to said bar in any manner. A guide-bar 9 is secured to the cylinder opposite each toothed bar 6 and is provided with openings registering with the openings 8 to receive the teeth 7 to give proper direction thereto in the radial movement of the bar 6 and to provide ample bearing for said teeth, and thereby prevent rapid wear both of the cylinder and teeth, which would be the case if the teeth 7 obtained a bearing against the sheet metal of the cylinder solely. Guide-pins 10 are secured to the bar 9 and project outward and operate in openings formed in the toothed bar 6 and give proper direction to said toothed bar in its radial reciprocating movements. Springs 11 coöperate with the toothed bar 6 to press the same outward and are preferably interposed between them and are mounted upon the guide-pins 10. A guide 12 is provided for each end of the tooth-bar 6 to control the latter in its radial movements. The guide 12 is arranged by preference upon the inner side of each upright or side piece 2, and the outer end of the toothed bar enters or makes engagement therewith, so as to be controlled by the said guide in the rotation of the cylinder. Each guide 12 has a cam portion 13 of such shape and relative location as to impart a radial movement to the toothed bar at the predetermined point in the revolution of the cylinder or drum. A deflecting-board 14 is arranged within the cylinder or drum 1 and is transversely inclined with reference to its length, so as to direct the ears of corn toward the inner side of the cylinder. This deflecting-board may be mounted in any manner; but it is preferred to support it in a way to admit of its transverse inclination being varied as occasion may require to move the ears toward the inner side of the cylinder with greater or less speed, according to the nature of the work and the relative speed or rotation of said cylinder. As shown, the deflecting-board 14 is attached at each end to a bar or lever 15, which is pivotally connected at 16 to the framework and which has adjustable connection at 17, so as to secure the deflecting-board in the required adjusted position. The bar or lever 15 is pivoted at one end to the framework at one side of the cylinder and is adjustably connected near its opposite end to the framework upon the opposite side of said cylinder. Any means may be employed for pivotally connecting and securing the part 15 in place. The upper edge of the deflecting-board 14 approaches close to the inner side of the cylinder 1, whereas its lower edge is arranged at some distance from the inner side of said cylinder to make provision for escape of the husks and to provide for a roll 18 being mounted in bearings applied to the bars or levers 15, so as to move therewith in the adjustment of the deflecting-board. The roll 18 is located below the plane of the deflecting-board and is arranged to come quite close to the inner side of the cylinder to coöperate therewith and with the inner or projecting ends of the teeth 7 to insure stripping or tearing of the husks from the ears and a discharge of said husks into the space arranged below the deflecting-board.

In the operation of the invention rotary movement is imparted to the cylinder or drum 1, and the ears of corn to be husked are fed in the said cylinder upon the deflecting-board 14 and are directed by the latter toward the inner side of said cylinder, and at the predetermined point in the rotation of the cylinder the teeth 7 penetrate and take hold of the husks and strip or tear the same from the ears, and when said teeth reach a point about opposite to the lower edge of the deflecting-board and to the roll 18 said teeth are withdrawn or moved outward by the action of the cam portion 13 of each of the guides 12 upon the toothed bar 6, thereby preventing injurious contact of said teeth with either the deflecting-board or roll, or both. The husks opened and started by the teeth are stripped from the ears by the action of the roll 18 and cylinder 1, the loose portions of said husks being caught between the adjacent surfaces of the parts 1 and 18, which in the continued rotation of the cylinder strip and pull the husks from the ears, the latter being moved downward and through the cylinder by gravitative action and the husks likewise moving through the cylinder and escaping therefrom at a point below the deflecting-board.

It will be understood from the foregoing that a machine constructed in accordance with this invention is exceedingly simple in operation, performs the work in a rapid and effective manner, and is adapted to be actuated by a minimum amount of force and is readily accessible in all parts to admit of quickly removing obstructing matter and for making repairs when the same become necessary.

While it is preferred to feed the ears of corn through the cylinder by gravitative action, nevertheless it is to be understood that a fan or other contrivance may be employed to effect this result in a positive manner. It is also contemplated to effect the stripping of the husks from the ears upon the outside of the cylinder instead of upon the inside, as herein described. In this adaptation of the invention the toothed bars and their adjunctive parts will be arranged upon the inner side of the cylinder, with the ends of the teeth projected outward therefrom, and the deflected board and coöperating roll will be placed exterior to the cylinder and in such relation as to effectively perform the desired result.

Having thus described the invention, what is claimed as new is—

1. In a corn-husking machine, the combination of a rotary cylinder, means for rotating the cylinder, husking mechanism including coöperating means exterior and interior to the cylinder, and means operating as the cylinder rotates for effecting relative movement of the coöperating exterior and interior means aforesaid.

2. A corn-husking machine embodying a rotary cylinder, means for directing the ears of corn to be husked through the said cylinder, and husking mechanism including means arranged exterior to the cylinder and rotatable therewith and adapted to project within the cylinder to effect a stripping of the husks from the ears.

3. A corn-husking machine embodying a rotary cylinder adapted to have the ears of corn to be husked passed therethrough, husking means exterior to and rotatable with said cylinder and comprising a toothed bar, means for imparting movement to said bar for projecting the teeth into the cylinder and withdrawing the same at a predetermined point in the rotation of the cylinder, and means in the cylinder coacting with the teeth.

4. In a machine of the character set forth, the combination of a rotary cylinder adapted to have the ears of corn passed therethrough, a toothed bar mounted to receive movement, a guide at each end of the cylinder for coöperation with corresponding ends of the toothed bar, each of said guides having a cam portion to impart movement to said toothed bar in the rotation of the cylinder, and means in the cylinder coacting with the toothed bar for effecting the husking operation.

5. In a machine of the character set forth, the combination of a cylinder adapted to have the ears of corn to be husked passed therethrough, husking mechanism including a radially-movable toothed bar, and a guide-bar secured to the cylinder and having openings to receive the inner ends of the teeth to give proper direction thereto in the radial movements of the toothed bar.

6. In a machine of the character specified, the combination of a rotary cylinder, husking mechanism including a radially-movable toothed bar, and guide means attached to said cylinder and projected outward therefrom for coöperation with the toothed bar to direct the same in its radial movements.

7. In a machine of the character set forth, the combination of a rotary cylinder, husking mechanism including a radially-movable toothed bar, a guide-bar secured to said cylinder and having openings for reception of the teeth of said toothed bar, coöperating guides between said bars, and spring means interposed between said bars for pressing the toothed bar outward to effect a withdrawal of the teeth.

8. In a machine of the character set forth, the combination of a rotary cylinder, husking means coöperating therewith, and a deflecting-board arranged within said cylinder and having a relative transverse inclination.

9. In a machine of the character set forth, the combination of a rotary cylinder, husking means coöperating therewith, a deflecting-board arranged within said cylinder and having a relative transverse inclination, and means for varying the transverse inclination of the deflecting-board, substantially as and for the purpose specified.

10. In a machine of the character set forth, the combination of a rotary cylinder, husking means coöperating therewith, a deflecting-board arranged within said cylinder and having a relative transverse inclination, and a roll arranged adjacent to the lower edge of the deflecting-board and the adjacent inner side of the cylinder.

11. In a machine of the character set forth, the combination of a rotary cylinder, husking means coöperating therewith, a deflecting-board arranged within said cylinder and having a relative transverse inclination, means for adjustably supporting the deflecting-board to admit of varying its transverse inclination, and a coöperating roll mounted upon said supporting means and movable therewith.

12. In a machine of the character set forth, the combination of a rotary cylinder, husking mechanism including stripping means for the husks arranged exterior to the cylinder and adapted to be projected therein and withdrawn therefrom, a deflecting-board located within the cylinder and having a relative transverse inclination, and means located about opposite to the lower portion of said deflecting-board to effect an outward movement of the said husking means.

13. In a husking-machine, the combination of a rotary cylinder and husking mechanism including a plurality of teeth movably mounted on said cylinder, means operating during the rotation of the cylinder for actuating the teeth, and means coacting with said teeth to effect stripping of the husk.

14. In a husking-machine, the combination of a rotary cylinder and husking mechanism including a plurality of teeth movably mounted on said cylinder and adapted to project thereinto, means for actuating the teeth, and a roller within the cylinder coacting with said teeth to effect stripping of the husk.

15. In a husking-machine, the combination of a rotary cylinder and husking mechanism including a plurality of teeth movably mounted on said cylinder, means for actuating the teeth, a roller coacting with said teeth to effect stripping of the husk, and an adjustable feed-board supporting said roller.

16. In a husking-machine, the combination of a rotary cylinder, and husking mechanism including a roller arranged within said rotary cylinder and rotatable by contact therewith to effect husking action.

17. In a husking-machine, the combination of a rotary cylinder, husking mechanism including a roller arranged within said rotary cylinder and rotatable by contact therewith to effect husking action, means for feeding material to be husked between the roller and the inner periphery of the cylinder, and means for adjusting the position of the roller.

In testimony whereof I affix my signature in presence of two witnesses.

SAMUEL A. DILLAVOU. [L. S.]

Witnesses:
W. C. SAUL,
W. I. SAUL.